US012570844B2

(12) United States Patent
Kim et al.

(10) Patent No.: US 12,570,844 B2
(45) Date of Patent: Mar. 10, 2026

(54) THERMOPLASTIC RESIN COMPOSITION

(71) Applicant: LG CHEM, LTD., Seoul (KR)

(72) Inventors: Seong Kyun Kim, Daejeon (KR); Seo Hwa Kim, Daejeon (KR); Byoung Il Kang, Daejeon (KR); Se Jin Han, Daejeon (KR); Yeong Min Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 464 days.

(21) Appl. No.: 18/033,539

(22) PCT Filed: Apr. 27, 2022

(86) PCT No.: PCT/KR2022/006049
§ 371 (c)(1),
(2) Date: Apr. 24, 2023

(87) PCT Pub. No.: WO2022/231317
PCT Pub. Date: Nov. 3, 2022

(65) Prior Publication Data
US 2024/0018347 A1 Jan. 18, 2024

(30) Foreign Application Priority Data

Apr. 28, 2021 (KR) ........................ 10-2021-0054765

(51) Int. Cl.
| | | |
|---|---|---|
| *C08L 25/12* | (2006.01) | |
| *A01N 59/16* | (2006.01) | |
| *C08K 3/08* | (2006.01) | |
| *C08K 3/22* | (2006.01) | |
| *C08L 23/0853* | (2025.01) | |
| *C08L 51/04* | (2006.01) | |

(52) U.S. Cl.
CPC .............. *C08L 25/12* (2013.01); *A01N 59/16* (2013.01); *C08K 2003/0893* (2013.01); *C08K 2003/2296* (2013.01); *C08L 23/0853* (2013.01); *C08L 51/04* (2013.01); *C08L 2205/035* (2013.01)

(58) Field of Classification Search
CPC .............. C08L 2205/035; C08L 25/12; C08L 23/0853; C08L 51/04; C08K 2003/0893; C08K 2003/2296
See application file for complete search history.

(56) References Cited

U.S. PATENT DOCUMENTS

| | | |
|---|---|---|
| 2018/0002521 A1 | 1/2018 | Jang et al. |
| 2018/0112056 A1 | 4/2018 | Yang et al. |
| 2018/0179314 A1 | 6/2018 | Kim et al. |
| 2019/0322854 A1 | 10/2019 | Yang et al. |

FOREIGN PATENT DOCUMENTS

| | | | |
|---|---|---|---|
| JP | H06-329870 A | 11/1994 | |
| JP | H08-027306 A | 1/1996 | |
| JP | H09-241475 A | 9/1997 | |
| JP | 2017-132913 A | 8/2017 | |
| JP | 2021-017464 A | 2/2021 | |
| KR | 10-2008-0112842 A | 12/2008 | |
| KR | 10-2009-0119573 A | 11/2009 | |
| KR | 10-2017-0069456 A | 6/2017 | |
| KR | 10-2018-0045777 A | 5/2018 | |
| KR | 10-1967961 B1 | 4/2019 | |
| KR | 10-2019-0051560 A | 5/2019 | |
| KR | 10-2005162 B1 | 8/2019 | |
| WO | 2018/124657 A1 | 7/2018 | |
| WO | WO-2020091343 A1 * | 5/2020 | .............. C08L 25/12 |

OTHER PUBLICATIONS

Machine translation of WO2020091343A1 obtained from IP.com (Year: 2020).*
Extended European Search Report issued Mar. 13, 2024 for European Patent Application No. 22796149.7 (Note: KR 10-2018-0045777 A, KR 10-1967961 B1 & KR 10-2017-0069456 A were cited in a prior IDS.).
International Search Report (with partial translation) and Written Opinion dated Aug. 4, 2022, for corresponding International Patent Application No. PCT/KR2022/006049.

* cited by examiner

*Primary Examiner* — Kregg T Brooks
*Assistant Examiner* — David R. Foss
(74) *Attorney, Agent, or Firm* — Morgan, Lewis & Bockius LLP

(57) ABSTRACT

The present disclosure relates to a thermoplastic resin composition including: a diene-based graft polymer; an acrylic graft polymer; a vinyl-based polymer including a vinyl aromatic monomer unit and a vinyl cyanide-based monomer unit; a polyamide elastomer; an olefin-based polymer including a vinyl acetate monomer unit; an inorganic antibacterial agent including a metal ion supported on a glass carrier; and a zinc oxide having a BET specific surface area of 11 to 28 m$^2$/g.

10 Claims, No Drawings

THERMOPLASTIC RESIN COMPOSITION

CROSS-REFERENCE TO RELATED APPLICATION

The present invention claims the benefit of priority based on Korean Patent Application No. 10-2021-0054765 dated Apr. 28, 2021, and all the contents disclosed in the document of the corresponding Korea patent application are incorporated as a part of the present specification.

TECHNICAL FIELD

The present invention relates to a thermoplastic resin composition, and more particularly, to a thermoplastic resin composition having excellent antibacterial properties, antibacterial persistence and chemical resistance.

BACKGROUND ART

Recently, as interest in personal health and hygiene has increased and income levels have risen, there has been an increasing need for thermoplastic resin molded articles comprising antibacterial hygiene functions. Accordingly, since the number of thermoplastic resin molded articles capable of removing or suppressing bacteria on the surfaces of household goods and home appliances is increasing, the development of stable and reliable functional antibacterial materials is required.

An antibacterial agent should be added in order to prepare an antibacterial thermoplastic resin composition, and these antibacterial agents may be divided into organic antibacterial agents and inorganic antibacterial agents. Organic antibacterial agents may be harmful to the human body and may be decomposed during processing at high temperature to lose or reduce the antibacterial effect, and cannot be used in various fields because their antibacterial persistence is not good. Although inorganic antibacterial agents have excellent thermal stability, inorganic antibacterial agents cannot be used in various fields because it is difficult to disperse the agents or the agents may be discolored during processing at high temperature and antibacterial persistence is not good due to the continuous elution of metal ions supported on a carrier.

Thus, research on antibacterial thermoplastic resin compositions which are harmless to the human body, maintain antibacterial ability even during processing at high temperature, and can be used in various fields due to good antibacterial persistence has been continuously conducted.

RELATED ART DOCUMENTS

Patent Document (Patent Document 1) JP1997-241475A

DISCLOSURE

Technical Problem

A problem to be solved by the present invention is to provide a thermoplastic resin composition having excellent antibacterial properties, antibacterial persistence, chemical resistance, appearance characteristics and impact resistance.

Technical Solution

To solve the above-described problem, (1) the present invention provides a thermoplastic resin composition comprising: a diene-based graft polymer; an acrylic graft polymer; a vinyl-based polymer comprising a vinyl aromatic monomer unit and a vinyl cyanide-based monomer unit; a polyamide elastomer; an olefin-based polymer comprising a vinyl acetate monomer unit; an inorganic antibacterial agent comprising a metal ion supported on a glass carrier; and a zinc oxide having a BET specific surface area of 11 to 28 $m^2/g$.

(2) The present invention provides the thermoplastic resin composition of (1), wherein the glass carrier is one or more selected from the group consisting of a phosphate glass carrier and a silicate glass carrier.

(3) The present invention provides the thermoplastic resin composition of (1) or (2), wherein the metal ion is one or more selected from the group consisting of a silver ion, a zinc ion and a copper ion.

(4) The present invention provides the thermoplastic resin composition of any one of (1) to (3), wherein the polyamide elastomer has a weight average molecular weight of 1,000 to 250,000 g/mol.

(5) The present invention provides the thermoplastic resin composition of any one of (1) to (4), wherein the polyamide elastomer is one or more selected from the group consisting of polyetheramide and polyetheresteramide.

(6) The present invention provides the thermoplastic resin composition of any one of (1) to (5), wherein the olefin-based polymer comprises the vinyl acetate monomer unit in an amount of 5 to 40 wt %.

(7) The present invention provides the thermoplastic resin composition of any one of (1) to (6), wherein the olefin-based polymer is an ethylene-vinyl acetate polymer.

(8) The present invention provides the thermoplastic resin composition of any one of (1) to (7), wherein the diene-based graft polymer comprises a diene-based rubbery polymer, and a vinyl aromatic monomer unit and a vinyl cyanide-based monomer unit grafted on the diene-based rubbery polymer.

(9) The present invention provides the thermoplastic resin composition of any one of (1) to (8), wherein the acrylic graft polymer comprises an acrylic rubbery polymer, and a vinyl aromatic monomer unit and a vinyl cyanide-based monomer unit grafted on the acrylic rubbery polymer.

(10) The present invention provides the thermoplastic resin composition of any one of (1) to (9), wherein the thermoplastic resin composition comprises: 10 to 40.0 parts by weight of the diene-based graft polymer; 1.0 to 30.0 parts by weight of the acrylic graft polymer; 55.0 to 85.0 parts by weight of the vinyl-based polymer; 0.1 to 20.0 parts by weight of the polyamide elastomer; 0.5 to 10.0 parts by weight of the olefin-based polymer; 0.1 to 3.0 parts by weight of the inorganic antibacterial agent; and 0.5 to 5.0 parts by weight of the zinc oxide, based on 100 parts by weight of a total of the diene-based graft polymer, the acrylic graft polymer and the vinyl-based polymer.

(11) The present invention provides the thermoplastic resin composition of any one of (1) to (10), wherein the thermoplastic resin composition comprises: 15.0 to 35.0 parts by weight of the diene-based graft polymer; 2.0 to 10.0 parts by weight of the acrylic graft polymer; 60.0 to 80.0 parts by weight of the vinyl-based polymer; 0.1 to 10.0 parts by weight of the polyamide elastomer; 0.5 to 5.0 parts by weight of the olefin-based polymer; 0.1 to 2.0 parts by weight of the inorganic antibacterial agent; and 1.0 to 4.0 parts by weight of the zinc oxide, based on 100 parts by weight of a total of the diene-based graft polymer, the acrylic graft polymer and the vinyl-based polymer.

Advantageous Effects

The thermoplastic resin composition of the present invention has excellent antibacterial properties and antibacterial persistence while maintaining basic physical properties such as chemical resistance, appearance characteristics and impact resistance. Therefore, the thermoplastic resin composition of the present invention can be used as a raw material for various antibacterial products.

MODES OF THE INVENTION

Hereinafter, the present invention will be described in more detail in order to help the understanding of the present invention.

The terms or words used in the present specification and the claims should not be construed as being limited to typical or dictionary meanings, and should be construed as meanings and concepts conforming to the technical spirit of the present invention on the basis of the principle that an inventor can appropriately define concepts of the terms in order to describe his or her own invention in the best way.

In the present invention, the weight average molecular weight of the vinyl-based polymer may be measured as a relative value with respect to a standard polystyrene sample by using tetrahydrofuran as an eluent and using gel permeation chromatography.

In the present invention, the weight average molecular weight of the polyamide elastomer may be measured by dissolving the polyamide elastomer in tetrahydrofuran at a concentration of 1 mg/ml, and then filtering the resulting solution with a 450 nm syringe filter, and using gel permeation chromatography.

In the present invention, the BET specific surface area of zinc oxide may be measured using a nitrogen gas adsorption method. More specifically, the BET specific surface area may be measured by a BET analyzer (Surface Area and Porosity Analyzer ASAP 2020 manufactured by Micromeritics).

In the present invention, the average particle diameter may be measured using a dynamic light scattering method, and more specifically, may mean the arithmetic average particle diameter in the particle size distribution measured by the dynamic light scattering method, that is, the scattering intensity average particle diameter.

And, in the present invention, the average particle diameter may be measured using the Nicomp 380 equipment manufactured by Particle Sizing Systems.

In the present invention, the diene-based monomer may be one or more selected from the group consisting of 1,3-butadiene, isoprene, chloroprene and piperylene, and among them, 1,3-butadiene is preferred.

In the present invention, the (meth)acrylate-based monomer may be a $C_1$ to $C_{10}$ alkyl (meth)acrylate-based monomer, and may be methyl (meth)acrylate, ethyl (meth)acrylate, propyl (meth)acrylate, butyl (meth)acrylate, heptyl (meth)acrylate, hexyl (meth)acrylate, 2-ethylhexyl (meth) acrylate an decyl (meth)acrylate, and among them, butyl acrylate is preferred.

In the present invention, the vinyl aromatic monomer may be one or more selected from the group consisting of styrene, α-methyl styrene, α-ethyl styrene and p-methyl styrene, and among them, styrene is preferred.

In the present invention, the vinyl cyanide-based monomer may be one or more selected from the group consisting of acrylonitrile, methacrylonitrile, phenylacrylonitrile and α-chloroacrylonitrile, and among them, acrylonitrile is preferred.

In the present invention, the olefin-based monomer may be one or more selected from the group consisting of ethylene, propylene and butylene, and among them, ethylene is preferred.

1. Thermoplastic Resin Composition

The thermoplastic resin composition according to an exemplary embodiment of the present invention comprises: a diene-based graft polymer; an acrylic graft polymer; a vinyl-based polymer comprising a vinyl aromatic monomer unit and a vinyl cyanide-based monomer unit; a polyamide elastomer; an olefin-based polymer comprising a vinyl acetate monomer unit; an inorganic antibacterial agent comprising a metal ion supported on a glass carrier; and a zinc oxide having a BET specific surface area of 11 to 28 $m^2$/g.

The thermoplastic resin composition according to an exemplary embodiment of the present invention may improve antibacterial properties and antibacterial persistence while maintaining basic physical properties such as appearance quality, chemical resistance and impact resistance due to the synergy of the polyamide elastomer, the olefin-based polymer, the inorganic antibacterial agent and zinc oxide. However, when the thermoplastic resin composition does not comprise the polyamide elastomer, antibacterial persistence, impact resistance and chemical resistance may significantly deteriorate. Further, when the thermoplastic resin composition does not comprise the olefin-based polymer, antibacterial persistence, impact resistance and chemical resistance may significantly deteriorate. In addition, when the thermoplastic resin composition does not comprise the inorganic antibacterial agent, antibacterial properties and antibacterial persistence may significantly deteriorate. Furthermore, when the thermoplastic resin composition does not comprise zinc oxide, antibacterial properties and antibacterial persistence may significantly deteriorate.

Hereinafter, the constituent elements of the thermoplastic resin composition according to an exemplary embodiment of the present invention will be described in detail.

1) Diene-Based Graft Polymer

A diene-based graft polymer is a constituent element that improves the impact resistance of a thermoplastic resin composition.

The diene-based graft polymer may be a graft polymer comprising a diene-based rubbery polymer, and a vinyl aromatic monomer unit and a vinyl cyanide-based monomer unit grafted on the diene-based rubbery polymer.

The diene-based rubbery polymer may be prepared by subjecting a diene-based monomer to a cross-linking reaction, and may have an average particle diameter of 50 to 600 nm, preferably 150 to 450 nm. When the above-described conditions are satisfied, impact resistance may be improved.

The content of the diene-based rubbery polymer in the diene-based graft polymer may be 40 to 80 wt %, preferably 50 to 70 wt %. When the above-described conditions are satisfied, the impact resistance of the diene-based graft polymer may be further improved.

The content of the vinyl aromatic monomer unit in the diene-based graft polymer may be 10 to 50 wt %, preferably 20 to 40 wt %. When the above-described conditions are satisfied, the processability of the diene-based graft polymer may be further improved.

The content of the vinyl cyanide-based monomer unit in the diene-based graft polymer may be 1 to 30 wt %, preferably 5 to 25 wt %. When the above-described conditions are satisfied, the chemical resistance of the diene-based graft polymer may be further improved.

The thermoplastic resin composition may comprise the diene-based graft polymer in an amount of 10.0 to 40 parts by weight, preferably 15.0 to 35.0 parts by weight, based on 100 parts by weight of a total of the diene-based graft polymer, the acrylic graft polymer and the vinyl-based polymer. When the above-described conditions are satisfied, the impact resistance of the thermoplastic resin composition may be further improved.

2) Acrylic Graft Polymer

An acrylic graft polymer is a constituent element that improves the impact resistance and weather resistance of a thermoplastic resin composition.

The acrylic graft polymer may be a graft polymer comprising an acrylic rubbery polymer, and a vinyl aromatic monomer unit and a vinyl cyanide-based monomer unit grafted on the acrylic rubbery polymer.

The acrylic rubbery polymer may be prepared by subjecting an acrylate-based monomer to a cross-linking reaction, and may have an average particle diameter of 100 to 600 nm, preferably 200 to 500 nm. When the above-described conditions are satisfied, both impact resistance and weather resistance may be improved.

The content of the acrylic rubbery polymer in the acrylic graft polymer may be 30 to 70 wt %, preferably 40 to 60 wt %. When the above-described conditions are satisfied, the impact resistance and weather resistance of the acrylic graft polymer may be further improved.

The content of the vinyl aromatic monomer unit in the acrylic graft polymer may be 20 to 60 wt %, preferably 30 to 50 wt %. When the above-described conditions are satisfied, the processability of the acrylic graft polymer may be further improved.

The content of the vinyl cyanide-based monomer unit in the acrylic graft polymer may be 1 to 30 wt %, preferably 5 to 20 wt %. When the above-described conditions are satisfied, the chemical resistance of the acrylic graft polymer may be further improved.

The thermoplastic resin composition may comprise the acrylic graft polymer in an amount of 1.0 to 30.0 parts by weight, preferably 2.0 to 10.0 parts by weight, based on 100 parts by weight of a total of the diene-based graft polymer, the acrylic graft polymer and the vinyl-based polymer. When the above-described conditions are satisfied, the impact resistance and weather resistance of the thermoplastic resin composition may be further improved.

3) Vinyl-Based Polymer

A vinyl-based polymer is a constituent element that improves the processability of a thermoplastic resin composition.

The vinyl-based polymer may comprise a vinyl aromatic monomer unit and a vinyl cyanide-based monomer unit at a weight ratio of 90:10 to 60:40, preferably 85:15 to 65:35. When the above-described conditions are satisfied, a vinyl-based polymer having improved processability and chemical resistance may be prepared.

The thermoplastic resin composition may comprise the vinyl-based polymer in an amount of 55.0 to 85.0 parts by weight, preferably 60.0 to 80.0 parts by weight, based on 100 parts by weight of the total of the diene-based graft polymer, the acrylic graft polymer and the vinyl-based polymer. When the above-described conditions are satisfied, the processability of the thermoplastic resin may be further improved.

4) Polyamide Elastomer

A polyamide elastomer is a constituent element that improves the antibacterial persistence of a thermoplastic resin composition. Specifically, since the elution rate of the metal ion of the inorganic antibacterial agent may be controlled to be slow but constant by the unshared electron pair of the polyamide elastomer, the antibacterial persistence of the thermoplastic resin composition may be significantly improved.

The polyamide elastomer may be one or more selected from the group consisting of polyetheramide and polyetheresteramide. And, the polyamide elastomer may have a hard segment comprising one or more selected from the group consisting of PA6, PA66, PA6/66, PA610, PA612, PA614 and PA616, and a soft segment in the form of polyether functionalized with $OH^-$ or $NH_2^-$.

The polyamide elastomer may have a weight average molecular weight of 1,000 to 250,000 g/mol, preferably 5,000 to 200,000 g/mol. When the above-described conditions are satisfied, a thermoplastic resin composition having further improved antibacterial persistence, impact resistance, appearance quality and chemical resistance may be prepared.

The thermoplastic resin composition may comprise the polyamide elastomer in an amount of 0.1 to 20.0 parts by weight, preferably 0.1 to 10.0 parts by weight, based on 100 parts by weight of the total of the diene-based graft polymer, the acrylic graft polymer and the vinyl-based polymer. When the above-described conditions are satisfied, a thermoplastic resin composition having further improved impact resistance, appearance quality and chemical resistance may be prepared.

5) Olefin-Based Polymer

An olefin-based polymer is a constituent element that improves the antibacterial persistence and chemical resistance of a thermoplastic resin composition.

The olefin-based polymer comprises a vinyl acetate monomer unit, and may comprise the vinyl acetate monomer unit in an amount of 5 to 40 wt %, preferably 10 to 35 wt %. When the above-described conditions are satisfied, the antibacterial persistence, chemical resistance and appearance characteristics of the thermoplastic resin composition may be further improved.

The olefin-based polymer may be an ethylene-vinyl acetate polymer.

The thermoplastic resin composition may comprise the olefin-based polymer in an amount of 0.5 to 10.0 parts by weight, preferably 0.5 to 5.0 parts by weight, based on 100 parts by weight of the total of the diene-based graft polymer, the acrylic graft polymer and the vinyl-based polymer. When the above-described conditions are satisfied, the constituent elements may be uniformly dispersed in the thermoplastic resin composition, and the appearance characteristics, antibacterial persistence and chemical resistance of the thermoplastic resin composition may be improved.

6) Inorganic Antibacterial Agent

An inorganic antibacterial agent is a constituent element that improves the antibacterial properties and antibacterial persistence of a thermoplastic resin composition.

The inorganic antibacterial agent comprises metal ions supported on a glass carrier, and the glass carrier allows the metal ions having antibacterial properties to be eluted at a constant but slow rate, so that the not only antibacterial properties but also antibacterial persistence may be significantly improved. Specifically, since the glass carrier elutes metal ions at a significantly lower rate than other carriers, the elution of metal ions may be sustained for a long time. This may significantly improve antibacterial persistence.

The glass carrier may be one or more selected from the group consisting of a phosphate glass carrier and a silicate glass carrier, and the metal ion may be one or more selected from the group consisting of a silver ion, a zinc ion and a copper ion.

The thermoplastic resin composition may comprise the inorganic antibacterial agent in an amount of 0.1 to 3.0 parts by weight, preferably 0.1 to 2.0 parts by weight, based on 100 parts by weight of a total of the diene-based graft polymer, the acrylic graft polymer and the vinyl-based polymer. When the above-described conditions are satisfied, antibacterial properties and antibacterial persistence may be improved without affecting the basic physical properties, such as impact resistance, of the thermoplastic resin composition.

7) Zinc Oxide

A zinc oxide is an antibacterial auxiliary agent and may further improve the antibacterial properties of a thermoplastic resin composition.

The zinc oxide may have a BET specific surface area of 11 to 28 $m^2/g$, preferably 12 to 20 $m^2/g$. When the above-described conditions are satisfied, antibacterial properties and antibacterial persistence are also improved while maintaining the basic physical properties of the thermoplastic resin composition. Under below or above the above-described conditions, antibacterial properties and antibacterial persistence are significantly reduced.

The thermoplastic resin composition may comprise the zinc oxide in an amount of 0.5 to 5.0 parts by weight, preferably 1.0 to 4.0 parts by weight, based on 100 parts by weight of the total of the diene-based graft polymer, the acrylic graft polymer and the vinyl-based polymer. When the above-described conditions are satisfied, the antibacterial properties and antibacterial persistence may be improved without affecting the basic physical properties of the thermoplastic resin composition, that is, impact resistance.

Hereinafter, the Examples of the present invention will be described in detail such that a person skilled in the art to which the present invention pertains can easily carry out the present invention. However, the present invention can be implemented in various different forms, and is not limited to the Examples described herein.

EXAMPLES AND COMPARATIVE EXAMPLES

Information on the components used in the following Examples and Comparative Examples is as follows.

A-1: Diene-based graft polymer prepared by graft-polymerizing styrene and acrylonitrile on a butadiene rubbery polymer having an average particle diameter of 300 nm (manufacturer: LG Chem Ltd., trade name: DP270E)

B-1: Acrylic graft polymer prepared by graft-polymerizing styrene and acrylonitrile on a butyl acrylate rubbery polymer having an average particle diameter of 450 nm (manufacturer: LG Chem Ltd., trade name: SA927)

C-1: Styrene/acrylonitrile polymer (manufacturer: LG Chem Ltd., trade name: 81HF)

D-1: Polyetheramide having a weight average molecular weight of 150,000 g/mol (manufacturer: AKEMA, trade name: MH2030)

E-1: Ethylene-vinyl acetate polymer (vinyl acetate monomer unit: 28 wt %, manufacturer: LG Chem Ltd., trade name: LG EVA EA28025)

F-1: Antibacterial agent in which anions are supported on phosphate glass carrier (manufacturer: ISHIZUKA, trade name: IONPURE WPA)

F-2: Antibacterial agent in which zinc ions are supported on silicate glass carrier (manufacturer: TOAGOSEI, trade name: VZ600)

F-3: Antibacterial agent in which silver ions are supported on silver zirconium phosphate carrier (manufacturer: TOAGOSEI, trade name: NOVARON® AGZ330)

G-1: Zinc oxide having BET specific surface area of 12 $m^2/g$ (manufacturer: Hanil Chemical Ind. Co., Ltd., trade name: NZ-TE30)

G-2: Zinc oxide having BET specific surface area of 15 $m^2/g$ (manufacturer: Hanil Chemical Ind. Co., Ltd., trade name: NZ-30)

G-3: Zinc oxide having BET specific surface area of 27 $m^2/g$ (manufacturer: TAEKYUNG SBC CO., LTD., trade name: ZINIKA-30N)

G-4: Zinc oxide having BET specific surface area of 8 $m^2/g$ (manufacturer: Hanil Chemical Ind. Co., Ltd., trade name: KS-1)

G-5: Zinc oxide having BET specific surface area of 32 $m^2/g$ (manufacturer: Sinopro Co., Ltd., trade name: SP1328)

A thermoplastic resin composition was prepared by mixing the above-described components in the contents shown in the following Tables 1 to 5 and stirring the resulting mixture.

Experimental Example 1

Pellets were prepared by putting the thermoplastic resin compositions of Examples and Comparative Examples were into a twin-screw extruder set at 230° C. and extruding the thermoplastic resin compositions. Samples were prepared by injecting these pellets, the physical properties were measured by the following methods, and the results are shown in the following Tables 1 to 5.

(1) Antibacterial activity value: In accordance with the ISO22196 antibacterial evaluation method, Escherichia coli and Staphylococcus aureus were inoculated onto 5 cm×5 cm×0.3 cm samples, respectively, and cultured under conditions of 35° C. and relative humidity 90% for 24 hours, and then antibacterial activity values were measured.

(2) Antibacterial persistence (after pre-treatment): In accordance with the ISO 22196 antibacterial evaluation method, Escherichia coli and Staphylococcus aureus were inoculated onto 5 cm×5 cm×0.3 cm samples immersed in water at 50° C. for 32 hours, respectively, and cultured under conditions of 35° C. and relative humidity 90% for 24 hours, and then antibacterial activity values were measured.

(3) Antibacterial persistence (after acid treatment): In accordance with the ISO 22196 antibacterial evaluation method, Escherichia coli was inoculated into 5 cm×5 cm×0.3 cm samples immersed in a 5 wt % citric acid solution for 16 hours, and cultured under conditions of 35° C. and relative humidity 90% for 24 hours, and then antibacterial activity values were measured.

(4) Antibacterial persistence (after alkali treatment): In accordance with the ISO 22196 antibacterial evaluation method, Escherichia coli was inoculated onto 5 cm×5 cm×0.3 cm samples immersed in a 5 wt % caustic soda solution for 16 hours, and cultured under conditions of 35° C. and relative humidity 90% for 24 hours, and then antibacterial activity values were measured.

(5) Appearance quality: The appearance of the ejected sample with a curved surface was evaluated with the naked eye.

○: No peeling occurred x: Peeling occurred (6) Chemical resistance: A jig-fixed sample with a jig strain of 1.1% was immersed in cyclopentane for 3 minutes and then subjected to a 180° bending test.

○: No change

Δ: Fine cracks occurred x: Fracture after cracks occurred

TABLE 1

| | Classification | | Example 1 | Example 2 | Example 3 | Example 4 |
|---|---|---|---|---|---|---|
| Diene-based graft polymer | A-1 (parts by weight) | | 24.0 | 24.0 | 24.0 | 24.0 |
| Acrylic graft polymer | B-1 (parts by weight) | | 5.0 | 5.0 | 5.0 | 5.0 |
| Vinyl-based polymer | C-1 (parts by weight) | | 71.0 | 71.0 | 71.0 | 71.0 |
| Polyamide elastomer | D-1 (parts by weight) | | 20.0 | 20.0 | 20.0 | 0.1 |
| Olefin-based polymer | E-1 (parts by weight) | | 2.0 | 2.0 | 2.0 | 2.0 |
| Inorganic antibacterial agent | F-1 (parts by weight) | | 0.4 | 0.4 | 0.4 | 0.4 |
| | F-2 (parts by weight) | | 0.0 | 0.0 | 0.0 | 0.0 |
| | F-3 (parts by weight) | | 0.0 | 0.0 | 0.0 | 0.0 |
| Zinc oxide | G-1 (parts by weight) | | 2.5 | 0.0 | 0.0 | 0.0 |
| | G-2 (parts by weight) | | 0.0 | 2.5 | 0.0 | 2.5 |
| | G-3 (parts by weight) | | 0.0 | 0.0 | 2.5 | 0.0 |
| Antibacterial activity value | Escherichia coli | | 6.6 | 6.6 | 6.6 | 6.6 |
| | Staphylococcus aureus | | 6.6 | 6.6 | 6.6 | 6.6 |
| Antibacterial persistence (After pre-treatment) | Escherichia coli | | 6.6 | 6.6 | 6.6 | 3.6 |
| | Staphylococcus aureus | | 5.5 | 5.5 | 5.5 | 2.5 |
| Antibacterial persistence (After acid treatment) | Escherichia coli | | 5.8 | 5.8 | 5.8 | 3.1 |
| Antibacterial persistence (after alkali treatment) | Escherichia coli | | 6.1 | 6.1 | 6.1 | 3.9 |
| | Appearance quality | | ○ | ○ | ○ | ○ |
| | Chemical resistance | | ○ | ○ | ○ | ○ |
| | Impact strength | | 27 | 28 | 30 | 20 |

TABLE 2

| | Classification | | Example 5 | Example 6 | Example 7 | Example 8 |
|---|---|---|---|---|---|---|
| Diene-based graft polymer | A-1 (parts by weight) | | 24.0 | 24.0 | 24.0 | 24.0 |
| Acrylic graft polymer | B-1 (parts by weight) | | 5.0 | 5.0 | 5.0 | 5.0 |
| Vinyl-based polymer | C-1 (parts by weight) | | 71.0 | 71.0 | 71.0 | 71.0 |
| Polyamide elastomer | D-1 (parts by weight) | | 10.0 | 0.1 | 0.1 | 0.1 |
| Olefin-based polymer | E-1 (parts by weight) | | 2.0 | 8.0 | 2.0 | 0.0 |
| | E-2 (parts by weight) | | 0.0 | 0.0 | 0.0 | 2.0 |
| Inorganic antibacterial agent | F-1 (parts by weight) | | 0.4 | 0.4 | 3.0 | 0.4 |
| | F-2 (parts by weight) | | 0.0 | 0.0 | 0.0 | 0.0 |
| | F-3 (parts by weight) | | 0.0 | 0.0 | 0.0 | 0.0 |

TABLE 2-continued

| Classification | | Example 5 | Example 6 | Example 7 | Example 8 |
|---|---|---|---|---|---|
| Zinc oxide | G-2 (parts by weight) | 2.5 | 2.5 | 2.5 | 2.5 |
| Antibacterial activity value | *Escherichia coli* | 6.6 | 6.6 | 6.6 | 6.6 |
| | *Staphylococcus aureus* | 6.6 | 6.6 | 6.6 | 6.6 |
| Antibacterial persistence (After pre-treatment) | *Escherichia coli* | 5.2 | 6.6 | 6.6 | 6.6 |
| | *Staphylococcus aureus* | 3.9 | 6.1 | 6.6 | 6.6 |
| Antibacterial persistence (After acid treatment) | *Escherichia coli* | 4.8 | 6.0 | 6.6 | 6.6 |
| Antibacterial persistence (after alkali treatment) | *Escherichia coli* | 5.2 | 5.9 | 6.6 | 6.6 |
| Appearance quality | | ○ | ○ | ○ | ○ |
| Chemical resistance | | ○ | ○ | ○ | ○ |
| Impact strength | | 25 | 24 | 20 | 20 |

TABLE 3

| Classification | | Example 9 | Example 10 | Example 11 | Example 12 |
|---|---|---|---|---|---|
| Diene-based graft polymer | A-1 (parts by weight) | 24.0 | 24.0 | 24.0 | 27.0 |
| Acrylic graft polymer | B-1 (parts by weight) | 5.0 | 5.0 | 5.0 | 2.0 |
| Vinyl-based polymer | C-1 (parts by weight) | 71.0 | 71.00 | 71.0 | 71.0 |
| Polyamide elastomer | D-1 (parts by weight) | 0.1 | 0.1 | 0.1 | 0.1 |
| Olefin-based polymer | E-2 (parts by weight) | 2.0 | 2.0 | 2.0 | 2.0 |
| Inorganic antibacterial agent | F-1 (parts by weight) | 0.1 | 0.4 | 0.0 | 0.4 |
| | F-2 (parts by weight) | 0.0 | 0.0 | 0.4 | 0.0 |
| | F-3 (parts by weight) | 0.0 | 0.0 | 0.0 | 0.0 |
| Zinc oxide | G-2 (parts by weight) | 2.5 | 0.5 | 2.5 | 2.5 |
| Antibacterial activity value | *Escherichia coli* | 6.6 | 5.2 | 4.2 | 6.6 |
| | *Staphylococcus aureus* | 6.6 | 4.1 | 3.9 | 6.6 |
| Antibacterial persistence (After pre-treatment) | *Escherichia coli* | 6.6 | 3.9 | 2.8 | 6.6 |
| | *Staphylococcus aureus* | 6.6 | 2.5 | 2.1 | 6.6 |
| Antibacterial persistence (After acid treatment) | *Escherichia coli* | 6.6 | 2.6 | 2.9 | 6.6 |
| Antibacterial persistence (after alkali treatment) | *Escherichia coli* | 6.6 | 2.8 | 2.3 | 6.6 |
| Appearance quality | | ○ | ○ | ○ | ○ |
| Chemical resistance | | ○ | ○ | ○ | ○ |
| Impact strength | | 22 | 24 | 22 | 21 |

TABLE 4

| Classification | | Comparative Example 1 | Comparative Example 2 | Comparative Example 3 | Comparative Example 4 |
|---|---|---|---|---|---|
| Diene-based graft polymer | A-1 (parts by weight) | 24.0 | 24.0 | 24.0 | 24.0 |
| Acrylic graft polymer | B-1 (parts by weight) | 5.0 | 5.0 | 5.0 | 5.0 |

TABLE 4-continued

| Classification | | Comparative Example 1 | Comparative Example 2 | Comparative Example 3 | Comparative Example 4 |
|---|---|---|---|---|---|
| Vinyl-based polymer | C-1 (parts by weight) | 71.0 | 71.0 | 71.0 | 71.0 |
| Polyamide elastomer | D-1 (parts by weight) | 20.0 | 20.0 | 0.0 | 0.1 |
| Olefin-based polymer | E-1 (parts by weight) | 2.0 | 2.0 | 2.0 | 0.0 |
| Inorganic antibacterial agent | F-1 (parts by weight) | 0.4 | 0.4 | 0.4 | 0.4 |
| | F-2 (parts by weight) | 0.0 | 0.0 | 0.0 | 0.0 |
| | F-3 (parts by weight) | 0.0 | 0.0 | 0.0 | 0.0 |
| Zinc oxide | G-2 (parts by weight) | 0.0 | 0.0 | 2.5 | 2.5 |
| | G-4 (parts by weight) | 2.5 | 0.0 | 0.0 | 0.0 |
| | G-5 (parts by weight) | 0.0 | 2.5 | 0.0 | 0.0 |
| Antibacterial activity value | *Escherichia coli* | 4.5 | 6.0 | 6.6 | 6.1 |
| | *Staphylococcus aureus* | 2.8 | 2.8 | 6.6 | 5.0 |
| Antibacterial persistence (After pre-treatment) | *Escherichia coli* | 3.2 | 5.6 | 2.1 | 3.5 |
| | *Staphylococcus aureus* | 1.9 | 1.8 | 1.6 | 3.5 |
| Antibacterial persistence (After acid treatment) | *Escherichia coli* | 2.2 | 2.3 | 2.0 | 3.8 |
| Antibacterial persistence (after alkali treatment) | *Escherichia coli* | 1.8 | 1.5 | 2.3 | 4.3 |
| Appearance quality | | ○ | ○ | ○ | ○ |
| Chemical resistance | | ○ | ○ | ○ | x |
| Impact strength | | 23 | 33 | 19 | 20 |

TABLE 5

| Classification | | Comparative Example 5 | Comparative Example 6 | Comparative Example 7 | Comparative Example 8 |
|---|---|---|---|---|---|
| Diene-based graft polymer | A-1 (parts by weight) | 24.0 | 24.0 | 29.0 | 0.0 |
| Acrylic graft polymer | B-1 (parts by weight) | 5.0 | 5.0 | 0.0 | 29.0 |
| Vinyl-based polymer | C-1 (parts by weight) | 71.0 | 71.0 | 71.0 | 71.0 |
| Polyamide elastomer | D-1 (parts by weight) | 0.1 | 0.1 | 0.1 | 0.1 |
| Olefin-based polymer | E-1 (parts by weight) | 2.0 | 2.0 | 2.0 | 2.0 |
| Inorganic antibacterial agent | F-1 (parts by weight) | 0.4 | 0.0 | 0.4 | 0.4 |
| | F-2 (parts by weight) | 0.0 | 0.0 | 0.0 | 0.0 |
| | F-3 (parts by weight) | 0.0 | 0.4 | 0.0 | 0.0 |
| Zinc oxide | G-2 (parts by weight) | 0.0 | 2.5 | 2.5 | 2.5 |
| Antibacterial activity value | *Escherichia coli* | 4.2 | 1.8 | 6.6 | 6.6 |
| | *Staphylococcus aureus* | 4.0 | 1.0 | 6.6 | 6.6 |
| Antibacterial persistence (After pre-treatment) | *Escherichia coli* | 0.5 | 0.9 | 6.6 | 6.6 |
| | *Staphylococcus aureus* | 0.2 | 0.4 | 6.6 | 6.6 |
| Antibacterial persistence (After acid treatment) | *Escherichia coli* | 0.3 | 0.5 | 6.6 | 6.6 |
| Antibacterial persistence (after alkali treatment) | *Escherichia coli* | 0.5 | 0.8 | 6.6 | 6.6 |

TABLE 5-continued

| Classification | Comparative Example 5 | Comparative Example 6 | Comparative Example 7 | Comparative Example 8 |
|---|---|---|---|---|
| Appearance quality | ○ | ○ | ○ | ○ |
| Chemical resistance | ○ | ○ | ○ | ○ |
| Impact strength | 22 | 22 | 17 | 15 |

Referring to Tables 1 to 5, Examples 1 to 12 all had excellent antibacterial properties, antibacterial persistence, appearance quality, chemical resistance and impact resistance. Meanwhile, when comparing Examples 1 to 3 and Comparative Examples 1 and 2, Examples 1 to 3 comprising a zinc oxide having a BET specific surface area of 11 to 28 $m^2/g$ had significantly excellent antibacterial properties and antibacterial persistence compared to Comparative Example 1 comprising a zinc oxide having a BET specific surface area of less than 11 $m^2/g$. Further, Examples 1 to 3 had excellent antibacterial properties and antibacterial persistence compared to Comparative Example 2 comprising a zinc oxide having a BET specific surface area of more than 28 $m^2/g$. Moreover, impact resistance was improved as the specific surface area of zinc oxide was increased. However, in Comparative Example 3 comprising no polyamide elastomer, antibacterial persistence significantly deteriorated.

In addition, in Comparative Example 4 comprising no olefin polymer, chemical resistance significantly deteriorated.

Furthermore, in Comparative Example 5 comprising no zinc oxide, antibacterial persistence significantly deteriorated.

Further, in Comparative Example 6 using a zirconium phosphate carrier as a carrier of an inorganic antibacterial agent, antibacterial properties and antibacterial persistence significantly deteriorated.

In addition, in Comparative Example 7 comprising no acrylic graft polymer and Comparative Example 8 comprising no diene-based graft polymer, impact resistance significantly deteriorated.

The invention claimed is:

1. A thermoplastic resin composition comprising:
a diene-based graft polymer;
an acrylic graft polymer;
a vinyl-based polymer comprising a vinyl aromatic monomer unit and a vinyl cyanide-based monomer unit;
a polyamide elastomer;
an olefin-based polymer comprising a vinyl acetate monomer unit;
an inorganic antibacterial agent comprising a metal ion supported on a glass carrier; and
a zinc oxide having a BET specific surface area of 11 to 28 $m^2/g$,
wherein, the thermoplastic resin composition comprises, based on 100 parts by weight of a total of the diene-based graft polymer, the acrylic graft polymer, and the vinyl-based polymer:
10.0 to 40.0 parts by weight of the diene-based graft polymer;

1.0 to 30.0 parts by weight of the acrylic graft polymer;
55.0 to 85.0 parts by weight of the vinyl-based polymer;
0.1 to 20.0 parts by weight of the polyamide elastomer;
0.5 to 10.0 parts by weight of the olefin-based polymer;
0.1 to 3.0 parts by weight of the inorganic antibacterial agent; and
0.5 to 5.0 parts by weight of the zinc oxide.

2. The thermoplastic resin composition of claim 1, wherein the glass carrier includes one or more selected from a phosphate glass carrier and a silicate glass carrier.

3. The thermoplastic resin composition of claim 1, wherein the metal ion includes one or more selected from a silver ion, a zinc ion and a copper ion.

4. The thermoplastic resin composition of claim 1, wherein the polyamide elastomer has a weight average molecular weight of 1,000 to 250,000 g/mol.

5. The thermoplastic resin composition of claim 1, wherein the polyamide elastomer includes one or more selected from polyetheramide and polyetheresteramide.

6. The thermoplastic resin composition of claim 1, wherein the olefin-based polymer comprises the vinyl acetate monomer unit in an amount of 5 to 40 wt %.

7. The thermoplastic resin composition of claim 1, wherein the olefin-based polymer includes an ethylene-vinyl acetate polymer.

8. The thermoplastic resin composition of claim 1, wherein the diene-based graft polymer comprises a diene-based rubbery polymer, and a vinyl aromatic monomer unit and a vinyl cyanide-based monomer unit grafted on the diene-based rubbery polymer.

9. The thermoplastic resin composition of claim 1, wherein the acrylic graft polymer comprises an acrylic rubbery polymer, and a vinyl aromatic monomer unit and a vinyl cyanide-based monomer unit grafted on the acrylic rubbery polymer.

10. The thermoplastic resin composition of claim 1, comprising, based on 100 parts by weight of the total of the diene-based graft polymer, the acrylic graft polymer and the vinyl-based polymer:
15.0 to 35.0 parts by weight of the diene-based graft polymer;
2.0 to 10.0 parts by weight of the acrylic graft polymer;
60.0 to 80.0 parts by weight of the vinyl-based polymer;
0.1 to 10.0 parts by weight of the polyamide elastomer;
0.5 to 5.0 parts by weight of the olefin-based polymer;
0.1 to 2.0 parts by weight of the inorganic antibacterial agent; and
1.0 to 4.0 parts by weight of the zinc oxide.

* * * * *